United States Patent
Kato et al.

(10) Patent No.: US 10,220,554 B2
(45) Date of Patent: Mar. 5, 2019

(54) INTAKE DEVICE AND MANUFACTURING METHOD OF VALVE BODY

(71) Applicant: AISIN SEIKI KABUSHIKI KAISHA, Kariya-shi, Aichi-ken (JP)

(72) Inventors: Takuya Kato, Toyota (JP); Masato Ishii, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/800,461

(22) Filed: Nov. 1, 2017

(65) Prior Publication Data
US 2018/0126612 A1 May 10, 2018

(30) Foreign Application Priority Data
Nov. 7, 2016 (JP) ................. 2016-216992

(51) Int. Cl.
| | |
|---|---|
| *F16K 1/22* | (2006.01) |
| *B29C 45/14* | (2006.01) |
| *F02M 35/108* | (2006.01) |
| *F02M 35/112* | (2006.01) |
| *F16K 1/226* | (2006.01) |
| *F16K 25/00* | (2006.01) |
| *B29L 31/00* | (2006.01) |

(52) U.S. Cl.
CPC ..... *B29C 45/14336* (2013.01); *F02M 35/108* (2013.01); *F02M 35/112* (2013.01); *F16K 1/223* (2013.01); *F16K 1/2261* (2013.01); *F16K 25/005* (2013.01); *B29C 2045/14459* (2013.01); *B29L 2031/7506* (2013.01); *Y10T 137/0525* (2015.04); *Y10T 137/6052* (2015.04)

(58) Field of Classification Search
CPC .... B29C 45/14336; B29C 2045/14459; F02M 35/112; F02M 35/108; F16K 25/005; F16K 1/2261; B29L 2031/7506; Y10T 137/0525; Y10T 137/6048; Y10T 137/6052
USPC ............ 137/15.25, 315.22–315.23; 123/337; 251/306, 317–317.01; 29/890.127
See application file for complete search history.

(56) References Cited

U.S. PATENT DOCUMENTS

| | | | | |
|---|---|---|---|---|
| 3,504,886 A | * | 4/1970 | Hnlslander | ............. F16K 1/226 251/306 |
| 3,670,071 A | * | 6/1972 | Walchle | ................. B29C 45/14 137/375 |
| 4,193,605 A | * | 3/1980 | Josephson | ............. F16K 1/2261 277/642 |

(Continued)

FOREIGN PATENT DOCUMENTS

| | | |
|---|---|---|
| JP | 2010-001847 A | 1/2010 |
| JP | 2014-101797 A | 6/2014 |

*Primary Examiner* — John Bastianelli
(74) *Attorney, Agent, or Firm* — Buchanan Ingersoll & Rooney PC

(57) ABSTRACT

An intake device includes: an intake port; and a valve body which is disposed in the intake port and is rotated around a rotation axial line between an open/closed position, in which the valve body includes a valve body main body made of a resin, an elastically deformable seal portion formed to extend along an outer circumferential portion of the valve body main body, and a projection which is provided at a surface part adjacent to a region in which the seal portion is formed in the valve body main body, and has a shape that gradually becomes tapered toward a tip end side.

8 Claims, 8 Drawing Sheets

(56) References Cited

U.S. PATENT DOCUMENTS

| | | | | |
|---|---|---|---|---|
| 4,411,405 | A | * | 10/1983 | Barbe .................... F16K 1/222 251/306 |
| 4,492,361 | A | * | 1/1985 | Jacquet ............. B60H 1/00678 251/306 |
| 5,035,214 | A | * | 7/1991 | Daly .................... F02D 9/1015 123/337 |
| 5,499,947 | A | * | 3/1996 | Tauber ............... B60H 1/00678 137/15.08 |
| 5,669,350 | A | * | 9/1997 | Altmann .................. F02D 9/10 251/306 |
| 6,135,418 | A | * | 10/2000 | Hatton ................. F02D 9/1015 251/306 |
| 6,193,600 | B1 | * | 2/2001 | Ito ..................... B60H 1/00678 454/69 |
| 6,908,072 | B2 | * | 6/2005 | Hattori ................ F16K 1/2261 251/306 |
| 7,090,575 | B2 | * | 8/2006 | Ito ..................... B60H 1/00678 251/314 |
| 8,430,113 | B2 | * | 4/2013 | Suetome ............ B29C 45/1459 251/368 |
| 9,624,838 | B2 | | 4/2017 | Oiwa et al. |
| 2004/0055565 | A1 | * | 3/2004 | Yamamoto ............ F02B 27/02 123/337 |
| 2011/0308640 | A1 | * | 12/2011 | Hasegawa ............ F02D 9/1015 137/455 |
| 2014/0116377 | A1 | * | 5/2014 | Ishii ................ F02M 35/10321 123/336 |
| 2015/0047595 | A1 | * | 2/2015 | Oiwa ................ F02M 35/1036 123/184.55 |

* cited by examiner

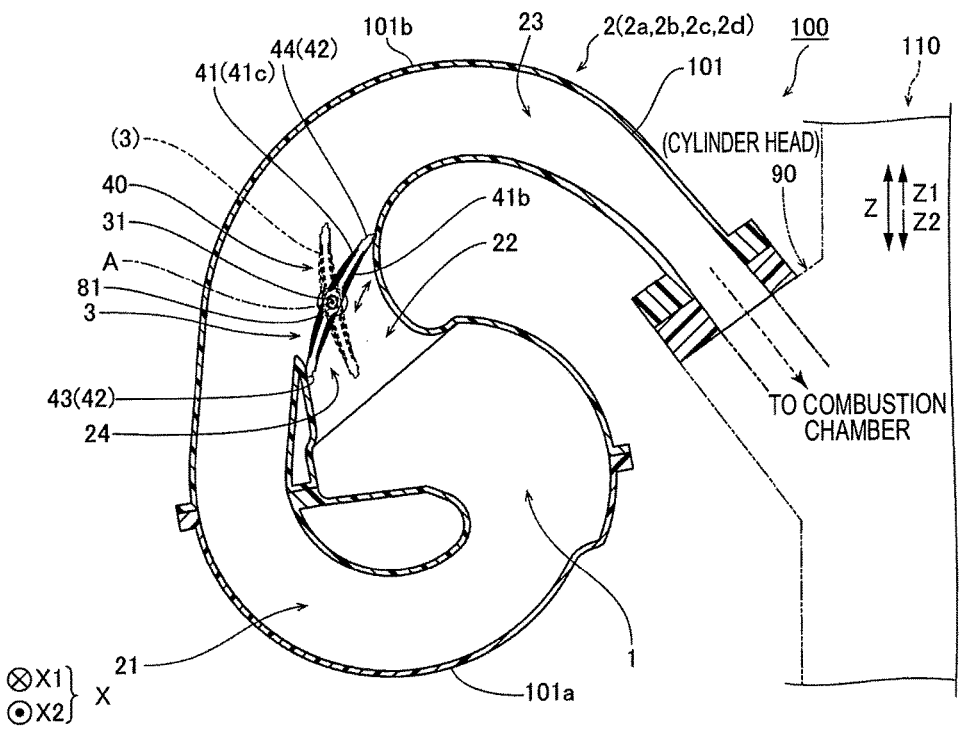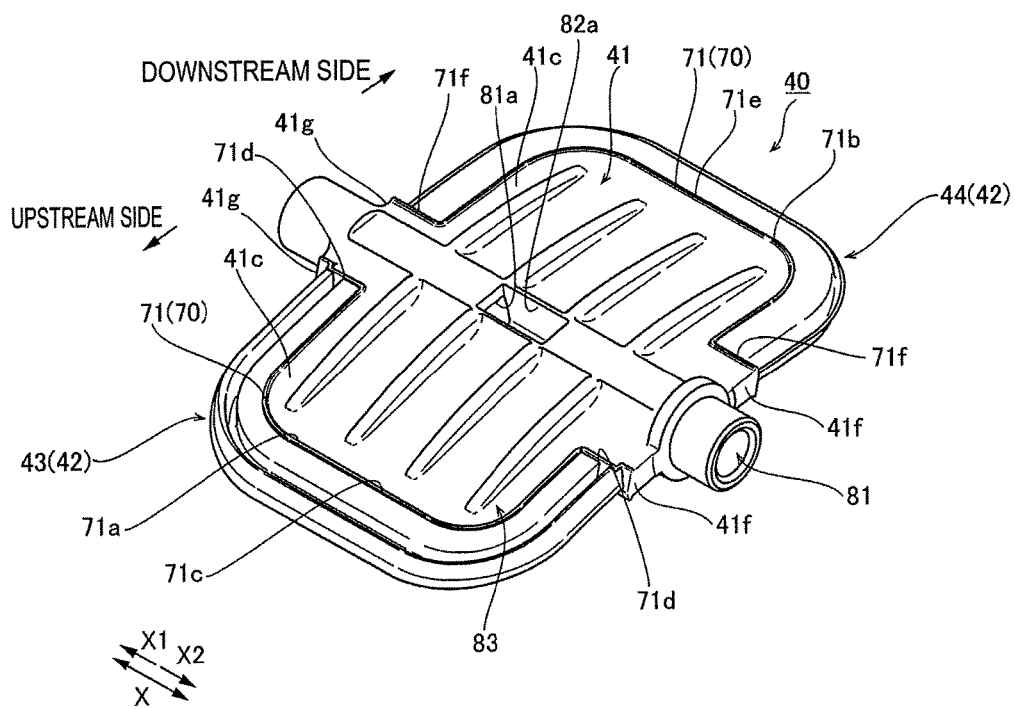

(FIRST MODIFICATION EXAMPLE)

(SECOND MODIFICATION EXAMPLE)

INTAKE DEVICE AND MANUFACTURING METHOD OF VALVE BODY

CROSS REFERENCE TO RELATED APPLICATIONS

This application is based on and claims priority under 35 U.S.C. § 119 to Japanese Patent Application 2016-216992, filed on Nov. 7, 2016, the entire contents of which are incorporated herein by reference.

TECHNICAL FIELD

This disclosure relates to an intake device and a manufacturing method of a valve body.

BACKGROUND DISCUSSION

In the related art, an intake device including a valve body disposed in an intake port is known (for example, refer to Japanese Patent No. 5255922 (Reference 1)).

In Reference 1 described above, a variable intake device including an intake control valve (valve body) disposed in the intake port is disclosed. The intake control valve includes a valve main body made of a resin material and a seal lip which is provided on an outer circumferential edge surface of the valve main body and is made of a rubber material.

In the variable intake device described in Reference 1, there is a case where the seal lip made of a rubber material is provided on the outer circumferential edge surface of the valve main body by an injection molding. In this case, as a seal lip forming material flows into a seal lip molding die in a state where the valve main body is disposed in a seal lip molding die, the seal lip is formed on the outer circumferential edge surface of the valve main body. In the injection molding, there is a case where a void is generated between the seal lip molding die and the valve main body in a case where the seal lip molding die and the valve main body do not tightly adhere to each other due to an unevenness of dimension of the valve main body. In this case, via the void generated between the seal lip molding die and the valve main body, it is considered that the seal lip forming material flows into a surface region on an inner side of the valve main body, the flowing-in part is generated as a flash, strength of the seal lip deteriorates, or dimension accuracy of the seal lip deteriorates. In addition, when the seal lip forming material flows into the surface region on the inner side of the valve main body, it is considered that a pressure of the seal lip forming material is applied to the valve main body, and deformation is generated in the valve main body. Therefore, when forming a seal portion, due to flowing of the seal lip forming material into the surface region on the inner side of the valve main body, it is considered that there is a problem that a manufacturing defect is generated in the intake control valve (valve body).

Thus, a need exists for an intake device which is not susceptible to the drawback mentioned above.

SUMMARY

An intake device according to a first aspect of this disclosure includes: an intake port; and a valve body which is disposed in the intake port and is rotated around a rotation axial line between an open/closed position, in which the valve body includes a valve body main body made of a resin, an elastically deformable seal portion formed to extend along an outer circumferential portion of the valve body main body, and a projection which is provided at a surface part adjacent to a region in which the seal portion is formed in the valve body main body, and has a shape that gradually becomes tapered toward a tip end side.

A manufacturing method of a valve body according to a second aspect of this disclosure includes: preparing a valve body main body which is disposed to be rotatable in an intake port, made of a resin, and includes a projection which is provided at a surface part adjacent to a region in which an elastically deformable seal portion is formed in the valve body main body and has a shape that gradually becomes tapered toward a tip end side; disposing the prepared valve body main body in a valve body main body disposing region of a seal portion molding die; applying a mold clamping load to the projection disposed in the valve body main body disposing region of the seal portion molding die by the seal portion molding die; and forming the seal portion by allowing a seal portion forming material to flow into the seal portion disposing region of the seal portion molding die in a state where the mold clamping load is applied to the projection.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a schematic sectional view along an intake port of the intake device according to one embodiment;

FIG. 3 is a perspective view when a valve body of the intake device according to one embodiment is viewed from one surface side;

DETAILED DESCRIPTION

Hereinafter, embodiments which specify the disclosure will be described based on the drawings. In addition, hereinafter, in a case of simply mentioning "downstream", the "downstream" means the downstream in a flow direction of gas that flows through an intake port 2. In addition, in a case of simply mentioning "upstream", the "upstream" means the upstream in a flow direction of gas that flows through the intake port 2.

Configuration of Intake Device

First, the entire configuration of an intake device 100 according to one embodiment of the disclosure will be described with reference to FIGS. 1 and 2.

Figure 1:
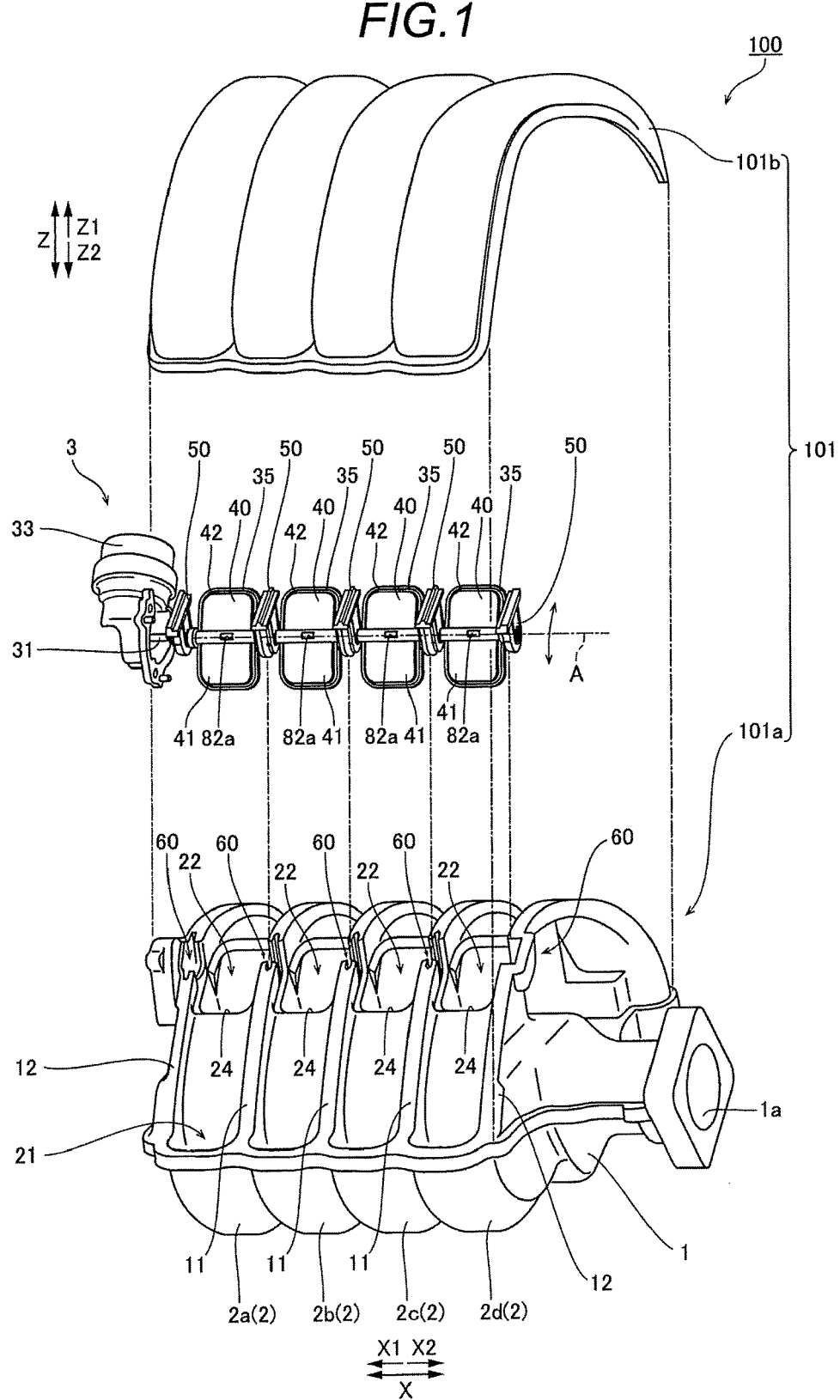
FIG. 1 is an exploded perspective view illustrating an intake device according to one embodiment of the disclosure.

As illustrated in FIGS. 1 and 2, the intake device 100 is a device which supplies gas for combustion including air to an internal combustion engine 110 (refer to FIG. 2) loaded on a vehicle, such as an automobile. The internal combustion engine 110 is an in-line multi-cylinder engine (four-cylinder) including a plurality (four) of cylinders. The intake device 100 includes a surge tank 1 which extends in an X direction, the intake port 2 connected to the downstream side of the surge tank 1, and an intake control valve 3 provided in the intake port 2. In addition, in the intake device 100, an intake device main body 101 is configured by integrating the surge tank 1 and the intake port 2. The intake port 2 includes a plurality of (four) intake ports 2a to 2d. In addition, the intake ports 2a to 2d have a substantially similar configuration.

The intake device main body 101 includes a resin-made main body portion 101a on which the intake control valve 3 is mounted, and a resin-made cover member 101b which covers the main body portion 101a. The main body portion 101a and the cover member 101b are bonded to each other by vibration welding in a state where the intake control valve 3 is mounted on the main body portion 101a. Accordingly, the intake control valve 3 is provided to be operable on the inside of the intake device main body 101. In addition, the intake device 100 is connected to a cylinder head 90 (refer to FIG. 2), and the intake ports 2a to 2d are respectively connected to each of the cylinders of the internal combustion engine 110 via the cylinder head 90.

The gas for combustion flows into the surge tank 1 from an input portion 1a. In addition, the intake ports 2a to 2d connected to the surge tank 1 are disposed to be aligned in the X direction to be adjacent to each other via an intermediate partition wall 11. In addition, end portion partition walls 12 are respectively formed further on the X1 direction side than the intermediate partition wall 11 that configures the intake port 2a on the most X1 direction side, and further on the X2 direction side than the intermediate partition wall 11 that configures the intake port 2d on the most X2 direction side.

In addition, as illustrated in FIG. 2, the intake port 2 includes a first port portion 21 of which the length of an intake path is relatively long, a second port portion 22 of which the length of an intake path is relatively shorter than that of the first port portion 21, and an outlet port portion 23 disposed on the downstream side of the first port portion 21 and the second port portion 22. The first port portion 21 extends upward (Z1 direction) while revolving a lower part (Z2 side) of the surge tank 1, and is connected to the outlet port portion 23. The second port portion 22 is configured to connect the surge tank 1 and the outlet port portion 23 to each other via the intake control valve 3.

The intake control valve 3 has a function of opening and closing an opening portion 24 provided at a connection part between the second port portion 22 and the outlet port portion 23, in the intake port 2. In a state where the intake control valve 3 is closed (illustrated by a solid line), a long port of which the length of the intake path is relatively long is configured of the first port portion 21 and the outlet port portion 23. In addition, in a state where the intake control valve 3 is open (illustrated by a two-dot chain line), a short port of which the length of the intake path is relatively short is configured of the second port portion 22 and the outlet port portion 23. Accordingly, in the intake device 100, the length of the intake path is changed by opening and closing the opening portion 24 by the intake control valve 3. In other words, the intake control valve 3 functions as a variable intake valve that changes the length of the intake path to each of the cylinders of the internal combustion engine 110. The intake device 100 is configured such that an appropriate amount of the gas for combustion is supplied to each of the cylinders of the internal combustion engine 110 via the cylinder head 90, as the length of the intake path changes in accordance with an engine speed and an engine load.

As illustrated in FIG. 1, the intake control valve 3 includes a metal-made (stainless steel, aluminum alloy or the like) shaft 31 which extends along a rotation axial line A (X direction), a plurality of (four) valve bodies 40 rotated around the rotation axial line A between an open/closed position, and an actuator 33 which rotates the shaft 31 by a driving force.

The shaft 31 is made of metal (stainless steel, aluminum alloy or the like), and has a square shape (rectangular shape) on a section orthogonal to the rotation axial line A. In addition, the shaft 31 is engaged with a shaft engaging portion 81a (refer to FIG. 6) of a shaft penetration portion 81 in a state of penetrating the shaft penetration portion 81 (refer to FIG. 3) which will be described later of four valve bodies 40. The actuator 33 is a linear motion negative pressure actuator, and has a role of a driving source that rotates the four valve bodies 40 which the shaft 31 penetrates and with which the shaft 31 is engaged, at the same time, by transmitting the driving force to the shaft 31.

The four valve bodies 40 are supported to be rotatable by five bearing members 50. In addition, the five bearing members 50 are configured to be disposed in five recessed holding portions 60 which are respectively formed on two end portion partition walls 12 and three intermediate partition walls 11. Accordingly, the intake control valve 3 including four valve bodies 40 is mounted on the main body portion 101a provided with the holding portion 60 via the bearing member 50.

Configuration of Valve Body

Next, a configuration of the valve body 40 of the intake control valve 3 will be described with reference to FIGS. 3 to 8. Since four valve bodies 40 have a substantially similar configuration, hereinafter, the single valve body 40 will be described.

Figure 4:
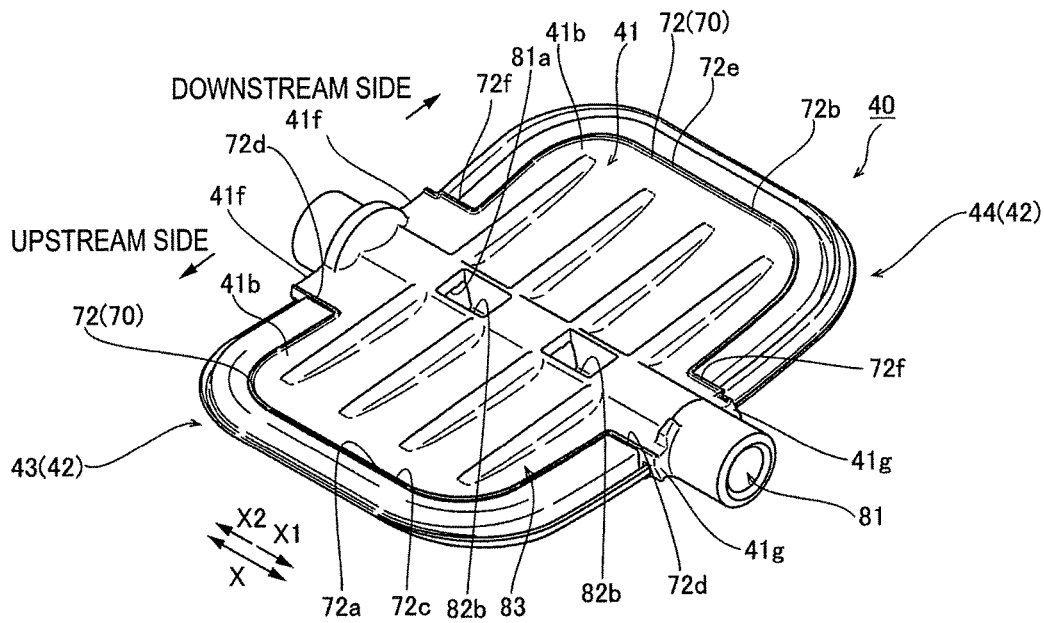
FIG. 4 is a perspective view when the valve body of the intake device according to one embodiment is viewed from the other surface side.
Figure 5:
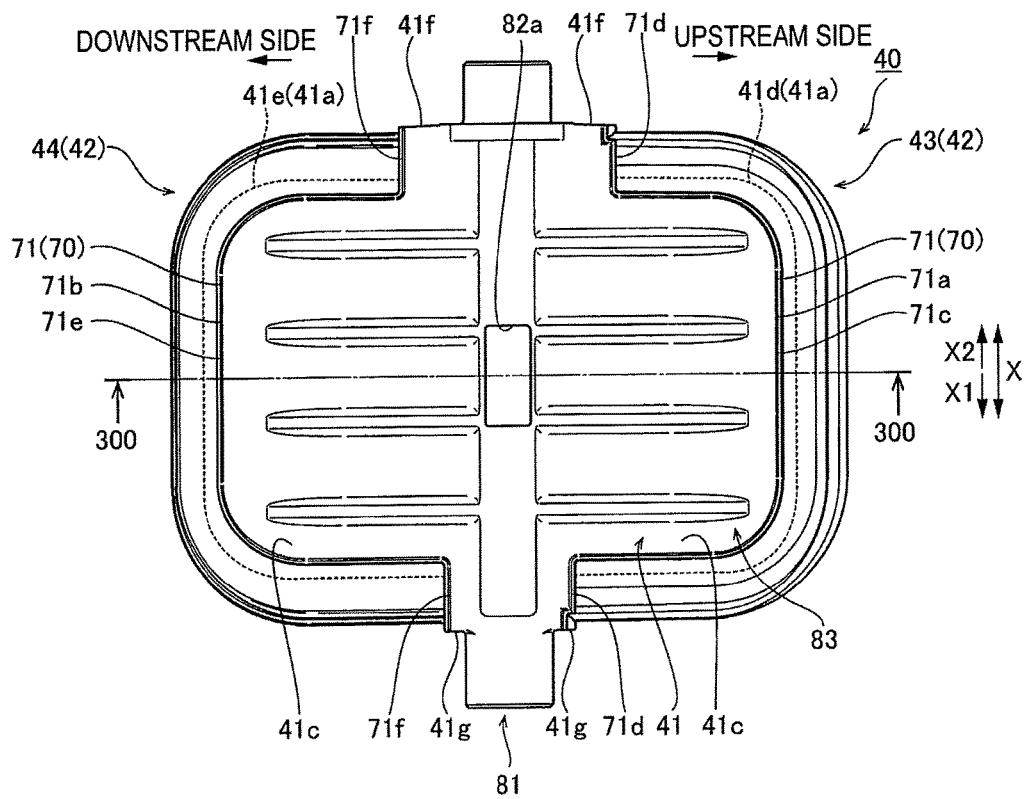
FIG. 5 is a plan view when the valve body of the intake device according to one embodiment is viewed from one surface side.

As illustrated in FIGS. 3 to 5, the valve body 40 is formed in a square shape to correspond to the square-shaped opening portion 24 (refer to FIG. 1) in a plan view. In addition, the valve body 40 is configured such that one end in a longitudinal direction orthogonal to a width direction (X direction) which is a direction in which the rotation axial line A extends is positioned on the downstream side, and the other end is disposed on the upstream side.

The valve body 40 includes a square-shaped valve body main body 41 made of a resin, and an elastically deformable seal portion 42 which is formed to extend along an outer circumferential portion 41a (refer to FIG. 5) of the valve body main body 41 and is made of elastomer. The valve body main body 41 is formed in an arch shape in a side view (when viewed from the X direction), and has a curve projected toward one surface 41c side from the other surface 41b side of the valve body main body 41.

The outer circumferential portion 41a of the valve body main body 41 includes a U-shaped outer circumferential part 41d formed on the upstream side, and a U-shaped outer circumferential part 41e formed on the downstream side. In addition, the seal portion 42 includes a seal part 43 which is formed at the outer circumferential part 41d on the upstream side, and is formed in a U shape to correspond to the U-shaped outer circumferential part 41d, and a seal part 44 which is formed at the outer circumferential part 41e on the downstream side, and is formed in a U shape to correspond to the U-shaped outer circumferential part 41d.

Here, in the embodiment, in the valve body main body 41, when forming the seal portion 42 by a seal portion molding die 200 (refer to FIG. 10) which will be described later, a projection 70 for preventing a seal portion forming material 205 (refer to FIG. 14) from flowing in is provided. The projection 70 is formed as a projection 120 (refer to FIG. 10) which will be described later is crushed by the seal portion molding die 200 when forming the seal portion 42 by the seal portion molding die 200. In other words, the projection 70 is a projection made by crushing the projection 120.

The projection 70 is formed at a surface part adjacent to a region in which the seal portion 42 is formed, in the valve body main body 41. The projections 70 are provided on both surfaces of the one surface 41c and the other surface 41b of the valve body main body 41. Specifically, the projection 70 includes a projection 71 (one example of a first projection) (refer to FIG. 3) provided along a forming region of the seal portion 42 on the one surface 41c side of the valve body main body 41, and a projection 72 (one example of a second projection) (refer to FIG. 4) provided along a forming region of the seal portion 42 on the other surface 41b side of the valve body main body 41. In addition, in the embodiment, the projection 70 is formed to similarly extend along the forming region of the seal portion 42 from one end surface 41f to the other end surface 41g of the valve body main body 41 in the width direction (X direction) of the valve body main body 41.

The projection 71 provided on the one surface 41c side of the valve body main body 41 includes a single projection 71a provided corresponding to the single seal part 43 on the upstream side of the seal portion 42, and a single projection 71b provided corresponding to the single seal part 44 on the downstream side of the seal portion 42. The projection 71a (71b) includes a U-shaped part 71c (71e) to correspond to the U-shaped seal part 43 (44) and one pair of straight line parts 71d (71f) which extends to the outer side in the width direction along the width direction of the valve body main body 41 from both end portions of the U-shaped part 71c (71e). One pair of straight line parts 71d (71f) is respectively formed to extend to the one end surface 41f and the other end surface 41g in the width direction (X direction) of the valve body main body 41.

The projection 72 provided on the other surface 41b side of the valve body main body 41 includes a single projection 72a provided corresponding to the single seal part 43 on the upstream side of the seal portion 42, and a single projection 72b provided corresponding to the single seal part 44 on the downstream side of the seal portion 42. The projection 72a and the projection 72b respectively have a configuration similar to that of the projection 71a and the projection 71b which are provided on the one surface 41c of the valve body main body 41. In other words, the projection 72a (72b) includes a U-shaped part 72c (72e), and one pair of straight line parts 72d (72f).

Hereinafter, for the convenience of the description, in a case where it is not necessary to particularly distinguish the projections, the projections 71a, 71b, 72a, and 72b are described as the projection 70. In addition, on the one surface 41c side, the projections 71a and 71b are described as the projection 71, and on the other surface 41b side, the projections 72a and 72b are described as the projection 72.

Figure 6:
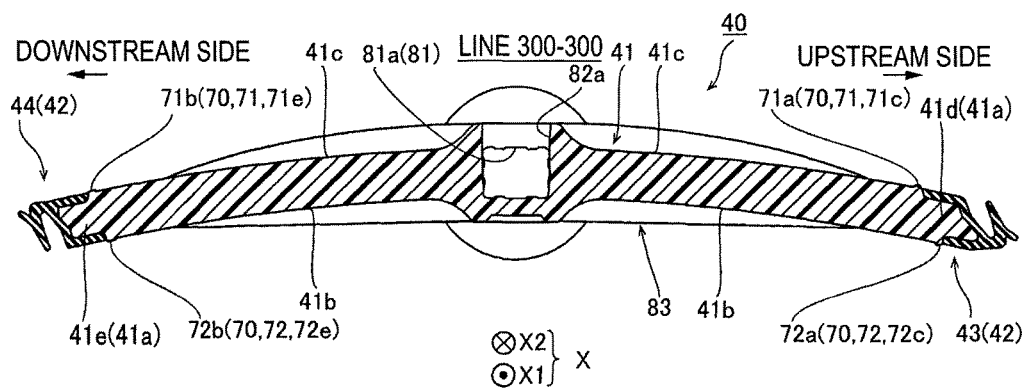
FIG. 6 is a sectional view taken along a line 300-300 of FIG. 6.
Figure 7:
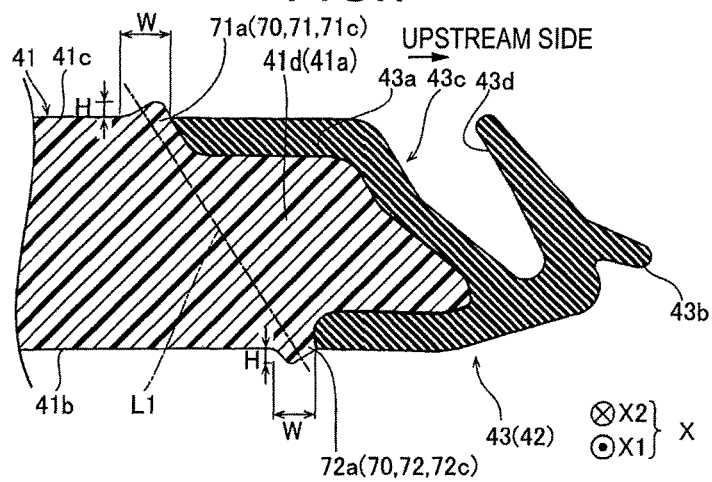
FIG. 7 is an enlarged sectional view of an end portion on an upstream side of the valve body of the intake device according to one embodiment.
Figure 8:
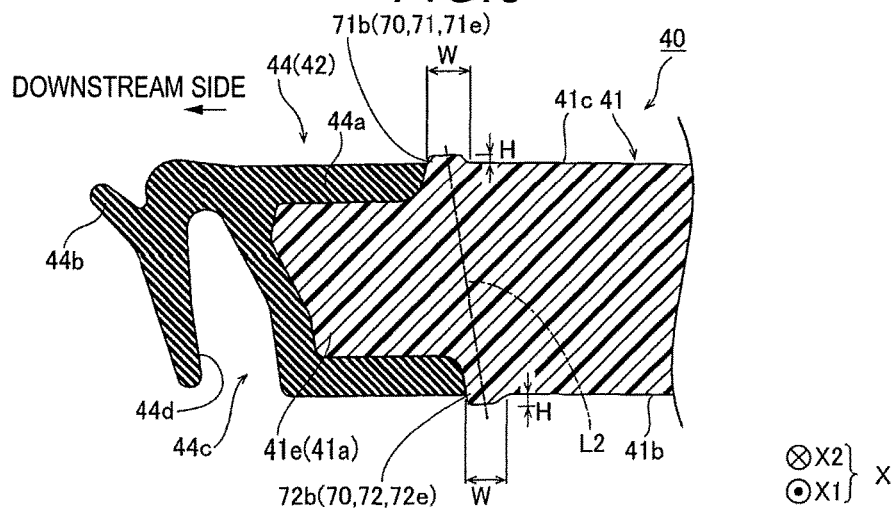
FIG. 8 is an enlarged sectional view of an end portion on a downstream side of the valve body of the intake device according to one embodiment.
Figure 9:
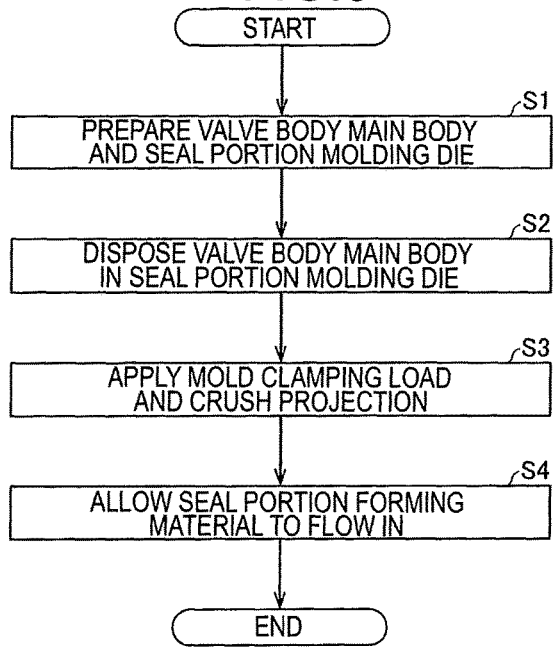
FIG. 9 is a flowchart for describing a manufacturing method of the valve body of the intake device according to one embodiment.

In addition, in the embodiment, as illustrated in FIGS. 6 to 8, the projection 70 has a shape of which a width of a tip end portion is narrower than a width of a root portion and which gradually becomes tapered toward the tip end side. In addition, the projection 70 has a projection width W which is greater than a protrusion height H, on a section orthogonal to the direction in which the projection 70 extends. Here, the protrusion height H is a height from the surface (one surface 41c or the other surface 41b) of the valve body main body 41 to the tip end portion of the projection 70.

In addition, in the embodiment, the projection 71 and the projection 72 are disposed at a position at which a moment caused by a mold clamping load is not generated, when the mold clamping load is applied to the projection 71 and the projection 72 by the seal portion molding die 200 (refer to FIG. 10) which will be described later. Specifically, as illustrated in FIG. 7, on the upstream side of the valve body main body 41, the projection 71a and the projection 72a are disposed on a straight line L1 which extends along the applying direction of the mold clamping load by the seal portion molding die 200, on a section orthogonal to the direction in which the projection 71a and the projection 72a extend. In addition, as illustrated in FIG. 8, on the downstream side of the valve body main body 41, the projection 71b and the projection 72b are disposed on a straight line L2 which extends along the applying direction of the mold clamping load by the seal portion molding die 200, on a section orthogonal to the direction in which the projection 71b and the projection 72b extend. The straight lines L1 and L2 may be straight lines parallel to the mold clamping load direction, or may be straight lines inclined within a range of an angle which is greater than 0 degree and less than 20 degrees with respect to the mold clamping load direction.

In addition, as illustrated in FIGS. 3 to 5, in the valve body main body 41, the shaft penetration portion 81 which extends in the X direction in a center portion of the valve body main body 41, and is made of penetration hole into which the shaft 31 (refer to FIG. 1) is inserted, is provided. The shaft penetration portion 81 includes the shaft engaging portion 81a having a square shape on the section orthogonal to the rotation axial line A to correspond to the shaft 31 having a square shape on the section orthogonal to the rotation axial line A. The shaft 31 is engaged with (fitted to) the shaft engaging portion 81a of the shaft penetration portion 81 as being inserted into the shaft penetration portion 81 of the valve body main body 41 and pressurized into the shaft engaging portion 81a of the shaft penetration portion 81.

In addition, in the valve body main body 41, in the center portion on the one surface 41c side of the valve body main body 41 and on the other surface 41b side of the valve body main body 41, positioning opening portions 82a (refer to FIG. 3) and 82b (refer to FIG. 4) for positioning the valve body main body 41 in the seal portion molding die 200, are respectively provided. Both of the positioning opening portions 82a and 82b are open in the applying direction of the mold clamping load by the seal portion molding die 200. In addition, in the valve body main body 41, a plurality of reinforcing ribs 83 are provided on both surfaces of the one surface 41c and the other surface 41b of the valve body main body 41.

As illustrated in FIGS. 6 and 7, the seal part 43 of the seal portion 42 includes an attaching portion 43a for attaching the seal part 43 to the outer circumferential part 41d of the outer circumferential portion 41a of the valve body main body 41, a seal part 43b which is in surface-contact with an inner wall of the intake device main body 101 when the valve body 40 is at a closed position, and a V-shaped connection portion 43c which connects the attaching portion 43a and the seal part 43b to each other. An inner surface 43d on the outer side in the longitudinal direction of the V-shaped connection portion 43c is formed to extend in the applying direction of the mold clamping load by the seal portion molding die 200 in order to make it easy to perform die cutting of the seal portion molding die 200.

In addition, as illustrated in FIGS. 6 to 8, the seal part 44 of the seal portion 42 includes an attaching portion 44a for attaching the seal part 44 to the outer circumferential part 41d of the outer circumferential portion 41a of the valve body main body 41, a seal part 44b which is in surface-contact with the inner wall of the intake device main body 101 when the valve body 40 is at a closed position, and a V-shaped connection portion 44c which connects the attaching portion 44a and the seal part 44b to each other. An inner surface 44d on the outer side in the longitudinal direction of the V-shaped connection portion 44c is formed to extend in the applying direction of the mold clamping load by the seal portion molding die 200 in order to make it easy to perform die cutting of the seal portion molding die 200. In addition, the V-shaped connection portion 43c of the seal part 43 and the V-shaped connection portion 44c of the seal part 44 are formed such that opening directions are reverse to each other.

Manufacturing Method of Valve Body of Intake Device

Next, a manufacturing method of the valve body 40 of the intake device 100 according to one embodiment of the disclosure will be described with reference to FIGS. 9 to 14.

Figure 10:
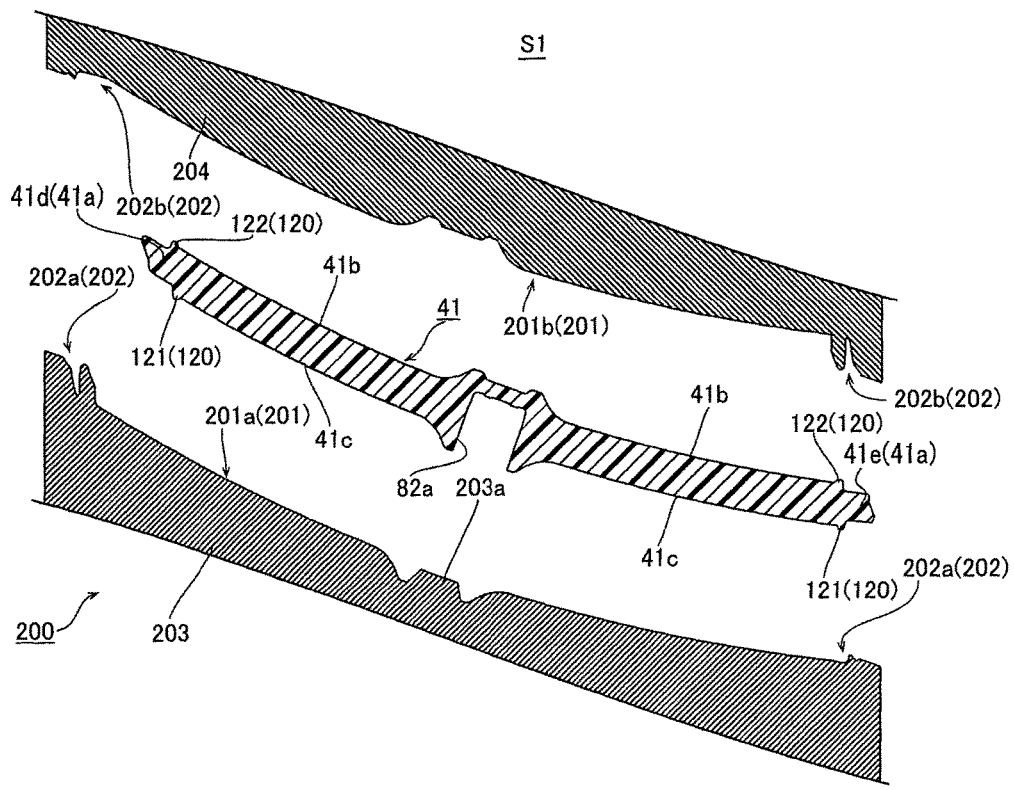
FIG. 10 is a view for describing step S1 of the manufacturing method of the valve body of the intake device according to one embodiment.

First, in step S1 (refer to FIG. 9), as illustrated in FIG. 10, the resin-made valve body main body 41 and the metal-made seal portion molding die 200 are prepared. The prepared resin-made valve body main body 41 is formed by injection molding by a valve body main body molding die (not illustrated). In addition, in the prepared valve body main body 41, while a configuration other than the above-described projection 70 is provided, the projection 70 is not provided. In the prepared valve body main body 41, the projection 120 having a trapezoidal shape which gradually becomes tapered toward the tip end side is provided to correspond to the projection 70. The projection 120 includes a projection 121 provided on the one surface 41c side of the valve body main body 41, and a projection 122 provided on the other surface 41b side of the valve body main body 41.

In the prepared seal portion molding die 200, a valve body main body disposing region 201 having a shape that corresponds to the shape of the valve body main body 41 in order to dispose the valve body main body 41, and a seal portion disposing region 202 having a shape that corresponds to the shape of the seal portion 42 in order to form the seal portion 42 in the outer circumferential portion 41a of the valve body main body 41 disposed in the valve body main body disposing region 201. In addition, the seal portion molding die 200 includes a lower mold 203 and an upper mold 204. The lower mold 203 includes a lower valve body main body disposing region 201a, a lower seal portion disposing region 202a, and a positioning projected portion 203a which positions the valve body main body 41 as being inserted into the positioning opening portion 82a (refer to FIG. 3) of the valve body main body 41. The upper mold 204 includes an upper valve body main body disposing region 201b, an upper seal portion disposing region 202b, and a positioning projected portion (not illustrated) which positions the valve body main body 41 as being inserted into the positioning opening portion 82b (refer to FIG. 4) of the valve body main body 41.

Figure 11:
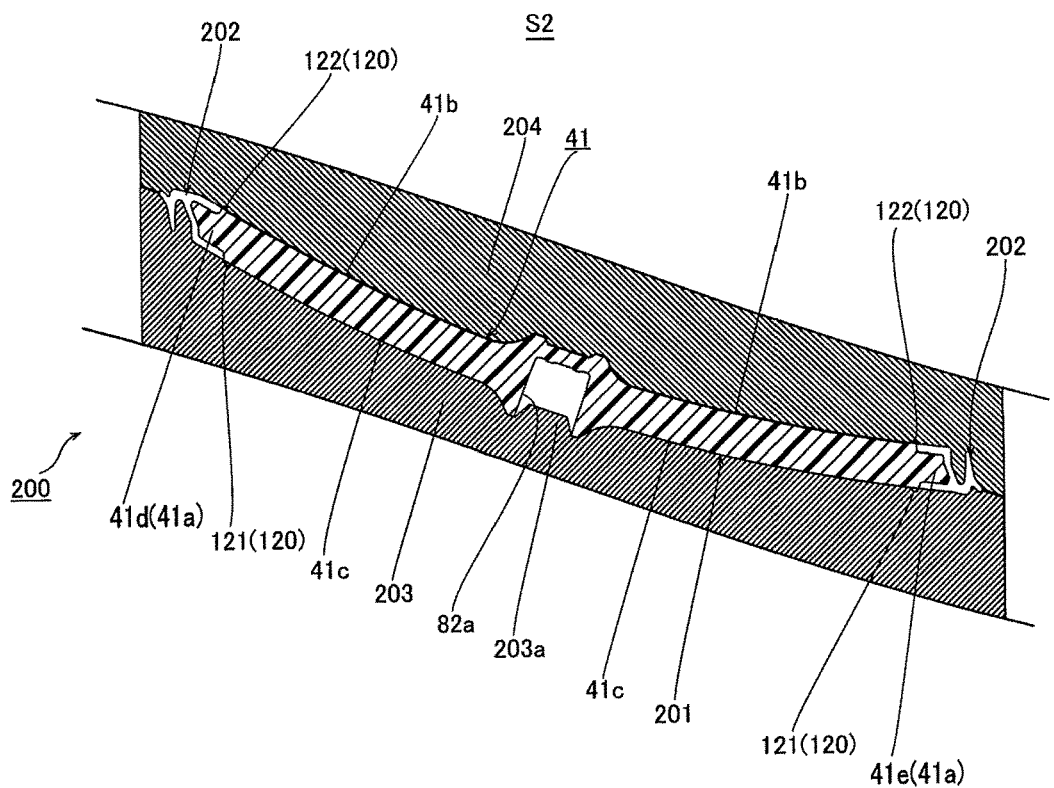
FIG. 11 is a view for describing step S2 of the manufacturing method of the valve body of the intake device according to one embodiment.

Next, in step S2 (refer to FIG. 9), as illustrated in FIG. 11, as the lower mold 203 and the upper mold 204 abut against each other, the prepared valve body main body 41 is disposed in the valve body main body disposing region 201 of the seal portion molding die 200.

Figure 12:
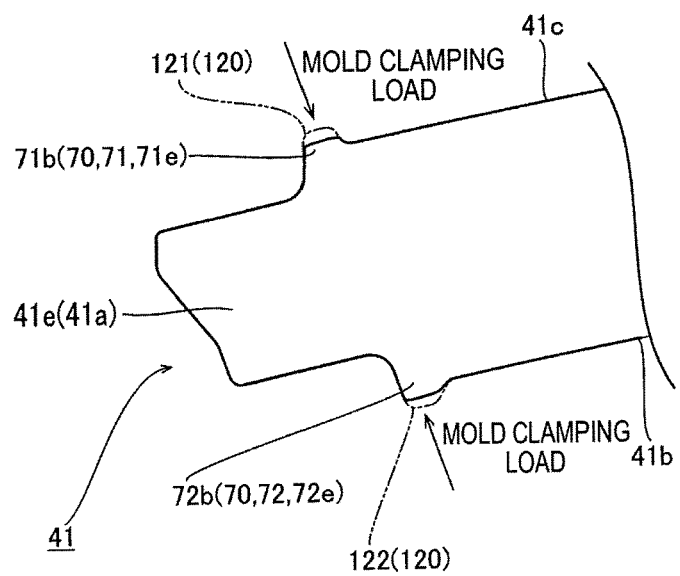
FIG. 12 is a view for describing step S3 of the manufacturing method of the valve body of the intake device according to one embodiment.
Figure 13:
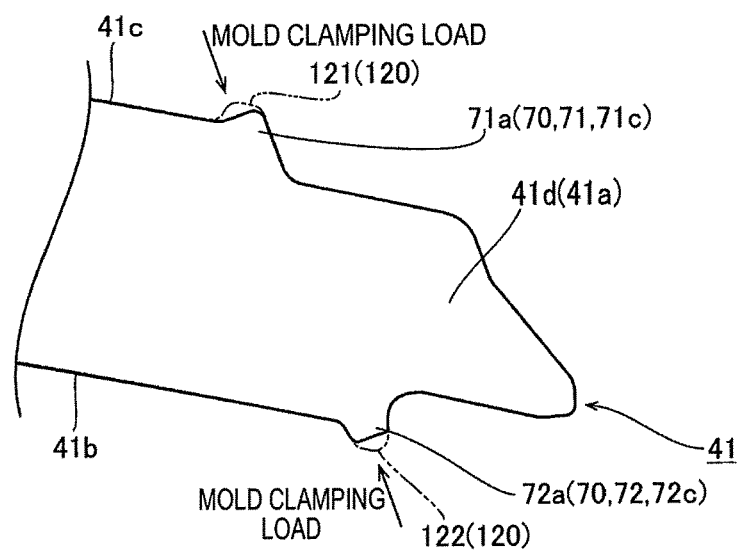
FIG. 13 is another view for describing step S3 of the manufacturing method of the valve body of the intake device according to one embodiment.

Next, in step S3 (refer to FIG. 9), as illustrated in FIGS. 12 and 13, the mold clamping load is applied to the projection 120 of the valve body main body 41 disposed in the valve body main body disposing region 201 of the seal portion molding die 200. At this time, the mold clamping load to the extent that the projection 120 is crushed is applied to the projection 120. Accordingly, the projection 120 having a trapezoidal shape is crushed, and the projection 70 having a shape obtained by crushing the trapezoidal shape which is a shape before crushing, is formed. The protrusion height H of the formed projection 70 is smaller than the protrusion height of the projection 120 before the crushing. Specifically, the protrusion height H of the formed projection 70 is equal to or less than ½ of the protrusion height of the projection 120 before the crushing. In addition, the projection width W of the formed projection 70 is substantially the same as or slightly greater than the projection width of the projection 120 before the crushing.

Here, in the embodiment, the protrusion height of any one of the projection 121 and the projection 122 is greater than the protrusion height of the other one of the projection 121 and the projection 122, in order to correct the curve of the valve body main body 41. There is a case where the valve body main body 41 becomes greater (the curve becomes smaller than that on the design) on the one surface 41c side of the valve body main body 41 on which the projection 121 is provided, or becomes greater (the curve becomes greater than that on the design) on the other surface 41b side of the valve body main body 41 on which the projection 122 is provided, when the valve body main body 41 is formed by resin molding. In this case, in accordance with the curve of the valve body main body 41, by increasing the depth of a groove portion for the projection 121 or the groove portion for the projection 122 which are formed in the valve body main body molding die, the protrusion height of any one of the projection 121 and the projection 122 becomes greater than the protrusion height of the other one of the projection 121 and the projection 122.

For example, in a case where the curve of the valve body main body 41 is greater (the curve is smaller than that on the design) than that on the design, on the one surface 41c side of the valve body main body 41 on which the projection 121 is provided, the protrusion height of the projection 121 is made greater than the protrusion height of the projection 122. Accordingly, it is possible to apply a force which is greater than that to the projection 122 to the projection 121 by the seal portion molding die 200. As a result, since it is possible to apply the force that makes the valve body main body 41 curved to the other surface 41b side by the seal portion molding die 200, in a case where the curve of the valve body main body 41 is greater than that on the design on the one surface 41c side of the valve body main body 41, it is possible to correct the curve of the valve body main body 41.

Otherwise, in a case where the curve of the valve body main body 41 is greater (the curve is greater than that on the design) than that on the design on the other surface 41b side of the valve body main body 41 on which the projection 122 is provided, the protrusion height of the projection 122 is made greater than the protrusion height of the projection 121. Accordingly, it is possible to apply the force which is greater than that to the projection 121 to the projection 122 by the seal portion molding die 200. As a result, since it is possible to apply the force that makes the valve body main body 41 curved to the one surface 41c side by the seal portion molding die 200, in a case where the curve of the valve body main body 41 is greater than that on the design on the other surface 41b side of the valve body main body 41, it is possible to correct the curve of the valve body main body 41.

In addition, as a result of making the protrusion heights of the projections 121 and 122 before the crushing vary, the protrusion height H of any one of the projection 71 and the projection 72 after the crushing becomes greater than the protrusion height H of the other one of the projection 71 and the projection 72.

Figure 14:
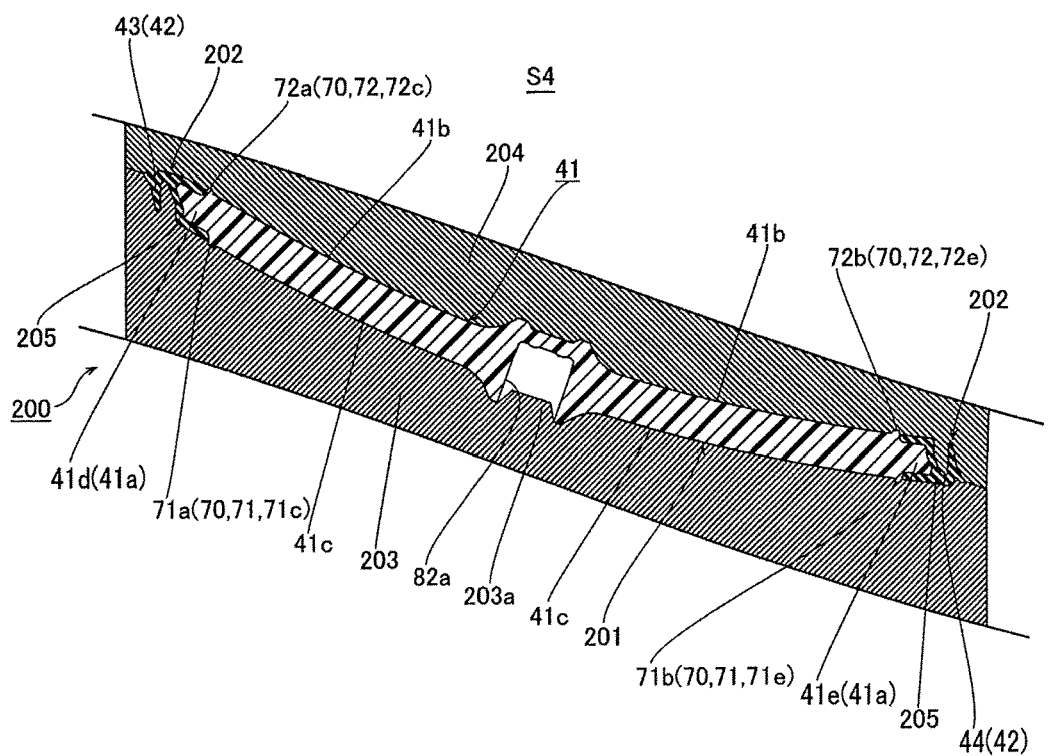
FIG. 14 is a view for describing step S4 of the manufacturing method of the valve body of the intake device according to one embodiment.

Next, in step S4 (refer to FIG. 9), as illustrated in FIG. 14, in a state where the mold clamping load is applied to the projection 120 (projection 70 after the crushing), the seal portion forming material 205 made of elastomer flows into the seal portion disposing region 202 of the seal portion molding die 200. After this, as the seal portion forming material 205 flowed into the seal portion disposing region 202 is vulcanized, the seal portion 42 is formed in the outer circumferential portion 41a of the valve body main body 41.

Effects of Embodiment

In the embodiment, it is possible to obtain the following effects.

In the embodiment, as described above, the projection 70 having a shape which gradually becomes tapered toward the tip end side is provided at the surface part adjacent to the region in which the seal portion 42 is formed, in the valve body main body 41. Accordingly, when forming the seal portion 42 in the valve body main body 41 by the seal portion molding die 200, even when there is an unevenness in dimension of the valve body main body 41, it is possible to allow the projection 70 of the valve body main body 41 and the seal portion molding die 200 to tightly adhere to each other. As a result, since it is possible to divide the seal portion disposing region of the seal portion molding die 200 and the surface (41b and 41c) region on the inner side of the valve body main body 41 by the projection 70, it is possible to suppress the flowing of the seal portion forming material 205 made of elastomer into the surface region on the inner side of the valve body main body 41. Accordingly, it is possible to suppress deterioration or the like of the strength of the seal portion 42 and the dimension accuracy of the seal portion 42 caused by the fact that the flowing-in part is generated as a flash due to the flowing of the seal portion forming material 205 into the surface region on the inner side of the valve body main body 41, and that the amount of the seal portion forming material 205 which forms the seal portion 42 decreases due to the flowing of the seal portion forming material 205 into the surface region on the inner side of the valve body main body 41. In addition, it is possible to suppress generation of deformation in the valve body main body 41 caused by the fact that the pressure of the seal portion forming material 205 is applied to the valve body main body 41 due to the flowing of the seal portion forming material 205 into the surface region on the inner side of the valve body main body 41. As a result, when forming the seal portion 42, it is possible to suppress generation of a manufacturing defect in the valve body due to the flowing of the seal portion forming material 205 into the surface region on the inner side of the valve body main body 41. In addition, as the projection 70 has a shape which gradually becomes tapered toward the tip end side, compared to a case where the projection 70 has a substantially constant width from a root side to the tip end side, it is possible to apply the mold clamping load to a small area. As a result, since it is possible to apply a greater force to the projection 70, the projection 70 and the seal portion molding die 200 can tightly adhere to each other by the greater force.

In addition, in the embodiment, as described above, the projection 70 is formed to extend along the forming region of the seal portion 42 from one end surface 41f to the other end surface 41g of the valve body main body 41 in the width direction of the valve body main body 41 which is the direction in which the rotation axial line A extends. Accordingly, it is possible to divide the seal portion disposing region of the seal portion molding die 200 and the surface region on the inner side of the valve body main body 41 by the projection 70, from the one end surface 41f to the other end surface 41g in the width direction of the valve body main body 41. As a result, it is possible to reliably suppress the flowing of the seal portion forming material 205 into the surface region on the inner side of the valve body main body 41.

In addition, in the embodiment, as described above, the projection 71 is provided along the forming region of the seal portion 42 on the one surface 41c side of the valve body main body 41, and the projection 72 is provided along the forming region of the seal portion 42 on the other surface 41b side of the valve body main body 41. Accordingly, on any one of the one surface 41c and the other surface 41b of the valve body main body 41, it is possible to divide the seal portion disposing region of the seal portion molding die 200 and the surface region on the inner side of the valve body main body 41 by the projection 70. As a result, on any one of the one surface 41c and the other surface 41b of the valve body main body 41, it is possible to suppress the flowing of the seal portion forming material 205 into the surface region on the inner side of the valve body main body 41.

In addition, in the embodiment, as described above, the protrusion height H of any one of the projection 71 and the projection 72 is greater than the protrusion height H on the other one of the projection 71 and the projection 72. Accordingly, in a case where the curve of the valve body main body 41 to the one surface 41c side of the valve body main body 41 on which the projection 71 is provided is large, when the protrusion height H of the projection 71 is greater than the protrusion height H of the projection 72, it is possible to apply the force which is greater than the force to the projection 72 to the projection 71 by the seal portion molding die 200. As a result, since it is possible to apply the force that makes the valve body main body 41 curved on the other surface 41b side by the seal portion molding die 200, in a case where the curve of the valve body main body 41 to the one surface 41c side of the valve body main body 41 is large, it is possible to correct the curve of the valve body main body 41. In addition, in a case where the curve of the valve body main body 41 to the other surface 41b side of the valve body main body 41 on which the projection 72 is provided is large, when the protrusion height H of the projection 72 is greater than the protrusion height H of the projection 71, it is possible to apply the force which is greater than that to the projection 71 to the projection 72 by the seal portion molding die 200. As a result, since it is possible to apply the force that makes the valve body main body 41 curved to the one surface 41c side by the seal portion molding die 200, in a case where the curve of the valve body main body 41 to the other surface 41b side of the valve body main body 41 is large, it is possible to correct the curve of the valve body main body 41.

In addition, in the embodiment, as described above, the projection 71 and the projection 72 are disposed at a position at which the moment caused by the mold clamping load is not generated when the mold clamping load is applied to the projection 71 and the projection 72 by the seal portion molding die 200. Accordingly, when the mold clamping load is applied to the projection 71 and the projection 72, as the moment is generated in the valve body main body 41 by the mold clamping load, it is possible to suppress generation of deformation in the valve body main body 41. As a result, when forming the seal portion 42, it is possible to suppress deterioration of dimension accuracy of the valve body main body 41.

In addition, in the embodiment, as described above, the single projection 71 is provided corresponding to the seal portion 42 on the one surface 41c side of the valve body main body 41. In addition, the single projection 72 is provided corresponding to the seal portion 42 on the other surface 41b side of the valve body main body 41. Accordingly, compared to a case where the plurality of projections 71 are provided corresponding to the seal portion 42, it is possible to apply a greater force to the single projection 71. Similarly, compared to a case where the plurality of projections 72 are provided corresponding to the seal portion 42, it is possible to apply a greater force to the single projection 72. As a result, the projection 71 and the projection 72, and the seal portion molding die 200 can tightly adhere to each other by the greater force.

In addition, in the embodiment, as described above, the projection 71 and the projection 72 are disposed on the straight line L1 (L2) which extends along the applying direction of the mold clamping load on the section orthogonal to the direction in which the projection 71 and the projection 72 extend. Accordingly, since it is possible to make the mold clamping load applied to the projection 71 and the mold clamping load applied to the second crushed projection have directions opposite to each other, and can be disposed on the same straight line L1 (L2), the projection 71 and the projection 72 can be reliably disposed at a position at which the moment caused by the mold clamping load is not generated.

In addition, in the embodiment, as described above, applying the mold clamping load to the projection 120 includes forming the crushed projection 70 by crushing the projection 120 by applying the mold clamping load to the projection 120. In other words, the projection 70 provided in the valve body 40 as a product is the projection 70 made by crushing the projection 120. Accordingly, compared to a case where the projection 120 is not crushed, when forming the seal portion 42, it is possible to further improve adhesiveness between the seal portion molding die 200 and the projection 120 (70). As a result, when forming the seal portion 42, it is possible to more effectively suppress the flowing of the seal portion forming material 205 into the surface region on the inner side of the valve body main body 41.

Modification Example

In addition, it should be considered that the embodiment disclosed here is merely an example and the disclosure is not limited thereto from all points of view. The scope of the disclosure is illustrated not by the description of the embodiment above but by the scope of claims, and further, all of the changes (modification examples) within the meaning and the range that are equivalent to the scope of the claims are included.

For example, in the above-described embodiment, an example in which the projection is crushed by applying the mold clamping load to the projection is illustrated, but the disclosure is not limited thereto. In the disclosure, when it is possible to divide the seal portion disposing region of the seal portion molding die and the surface region on the inner side of the valve body main body by the projection, the projection may not be crushed. In other words, in a state where the mold clamping load is applied to the extent that the projection is not crushed, the seal portion may be formed.

In addition, in the above-described embodiment, an example in which the projection is formed to extend along the forming region of the seal portion from one end surface to the other end surface of the valve body main body in the width direction of the valve body main body is illustrated, but the disclosure is not limited thereto. In the disclosure, when it is possible to divide the seal portion disposing region of the seal portion molding die and the surface region on the inner side of the valve body main body by the projection, the projection may not be formed to extend along the forming region of the seal portion from one end surface to the other end surface of the valve body main body in the width direction of the valve body main body.

In addition, in the above-described embodiment, an example in which the projections are provided on both surfaces of one surface and the other surface of the valve body main body is illustrated, but the disclosure is not limited thereto. For example, the projection may be provided only on any one of the one surface and the other surface of the valve body main body.

In addition, in the above-described embodiment, an example in which the protrusion height of one of the projection (projection) on one surface side and the projection (projection) on the other surface side is greater than the protrusion height H of the other one of the projection (projection) on one surface side and the projection (projection) on the other surface side, in order to correct the curve of the valve body main body, is illustrated, but the disclosure is not limited thereto. In the disclosure, when it is not necessary to correct the curve of the valve body main body, the protrusion heights of the projection (projection) on one surface side and the projection (projection) on the other surface side may be the same as each other. In addition, in order to correct the curve of the valve body main body, the protrusion height of the projection (projection) may vary on the same surface.

In addition, in the above-described embodiment, an example in which the single projection is provided on one surface side and the single projection is provided on the other surface side to correspond to the single seal part of the seal portion is illustrated, but the disclosure is not limited thereto. In the disclosure, a plurality of projections may be provided on one surface side, or a plurality of projections may be provided on the other surface side.

Figure 15:
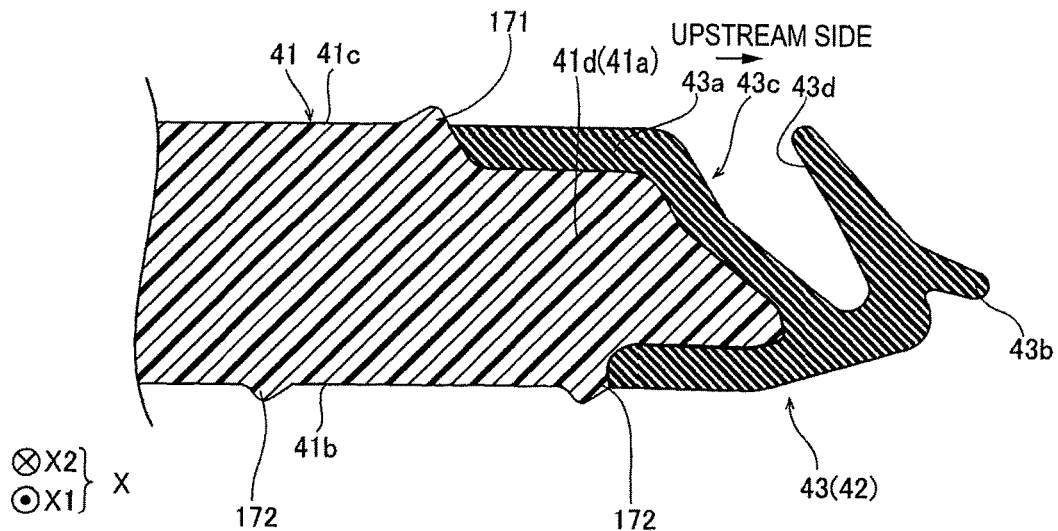
FIG. 15 is an enlarged sectional view of an end portion of an upstream side of a valve body of an intake device according to a first modification example of one embodiment.

For example, a configuration similar to a first modification example illustrated in FIG. 15 may be employed. In the first modification example, a single projection 171 (one example of the first projection) is provided on the one surface 41*c* side, and a plurality of (two) projections 172 (one example of the second projection) are provided on the other surface 41*b* side. In addition, in the first modification example, the single projection 171 and the two projections 172 are disposed on an isosceles triangle in which the single projection 171 and the two projections 172 are respectively vertexes, on the section orthogonal to the direction in which the projection 171 and the projection 172 extend. Even in a case of the disposition, the projection 171 and the projection 172 can be disposed at the position at which the moment caused by the mold clamping load is not generated. In addition, in FIG. 15, for the convenience of the description, only the projection on the upstream side is illustrated in the drawing and described, but the projection on the downstream side is substantially similarly configured.

Figure 16:
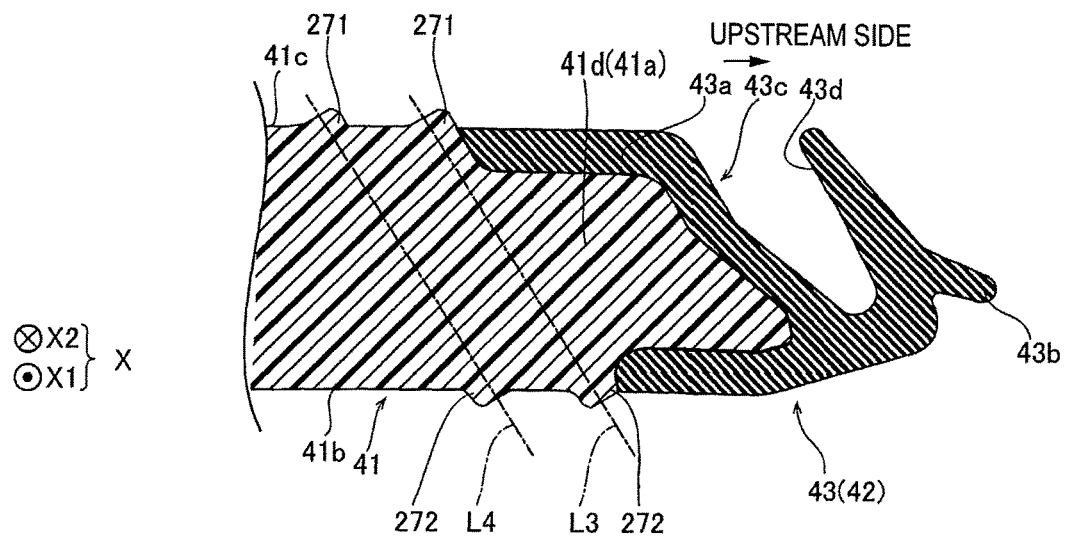
FIG. 16 is an enlarged sectional view of an end portion of an upstream side of a valve body of an intake device according to a second modification example of one embodiment.

In addition, a configuration similar to a second modification example illustrated in FIG. 16 may be employed. In the second modification example, a plurality of (two) projections 271 (one example of the first projection) are provided on the one surface 41*c* side, and a plurality of (two) projections 272 (one example of the second projection) are provided on the other surface 41*b* side. In addition, in the second modification example, the projection 271 and the projection 272 on the outer side in the longitudinal direction are disposed on a straight line L3 which extends along the applying direction of the mold clamping load by the seal portion molding die 200 on the section orthogonal to the direction in which the projection 271 and the projection 272 extend. In addition, the projection 271 and the projection 272 on the inner side in the longitudinal direction are disposed on a straight line L4 which extends along the applying direction of the mold clamping load by the seal portion molding die 200 on the section orthogonal to the direction in which the projection 271 and the projection 272 extend. Even in a case of the disposition, the projection 271 and the projection 272 can dispose at the position at which the moment caused by the mold clamping load is not generated. In addition, in FIG. 16, for the convenience of the description, only the projection on the upstream side is illustrated in the drawing and described, but the projection on the downstream side is substantially similarly configured.

In addition, in the above-described embodiment, an example in which the projection before the crushing has a trapezoidal shape which gradually becomes tapered toward the tip end side is illustrated, but the disclosure is not limited thereto. In the disclosure, as long as the projection before the crushing has a shape which gradually becomes tapered toward the tip end side, the projection may have a shape other than the trapezoidal shape. For example, the projection before the crushing may have a semicircular shape or a triangular shape which gradually becomes tapered toward the tip end side.

An intake device according to a first aspect of this disclosure includes: an intake port; and a valve body which is disposed in the intake port and is rotated around a rotation axial line between an open/closed position, in which the valve body includes a valve body main body made of a resin, an elastically deformable seal portion formed to extend along an outer circumferential portion of the valve body main body, and a projection which is provided at a surface part adjacent to a region in which the seal portion is formed in the valve body main body, and has a shape that gradually becomes tapered toward a tip end side.

In the intake device according to the first aspect of this disclosure, as described above, the projection having a shape which gradually becomes tapered toward the tip end side is provided at the surface part adjacent to the region in which the seal portion is formed in the valve body main body. Accordingly, when forming the seal portion in the valve body main body by a seal portion molding die, even when there is an unevenness in dimension of the valve body main body, the projection of the valve body main body and the seal portion molding die can tightly adhere to each other. As a result, since it is possible to divide the seal portion disposing region of the seal portion molding die and the surface region on the inner side of the valve body main body by the projection, it is possible to suppress flowing of the seal portion forming material into the surface region on the inner side of the valve body main body. Accordingly, it is possible to suppress deterioration or the like of the strength of the seal portion and the dimension accuracy of the seal portion caused by the fact that the flowing-in part is generated as a flash due to the flowing of the seal portion forming material into the surface region on the inner side of the valve body main body, and that the amount of the seal portion forming material which forms the seal portion decreases due to the flowing of the seal portion forming material into the surface region on the inner side of the valve body main body. In addition, it is possible to suppress generation of deformation in the valve body main body caused by the pressure of the seal portion forming material is applied to the valve body main body due to the flowing of the seal portion forming material into the surface region on the inner side of the valve body main body. As a result, when forming the seal portion, it is possible to suppress generation of a manufacturing defect in the valve body due to the flowing of the seal portion forming material into the surface region on the inner side of the valve body main body. In addition, as the projection has a shape which gradually becomes tapered toward the tip end side, compared to a case where the projection has a substantially constant width from a root side to the tip end side, it is possible to apply a mold clamping load to a small area. As a result, since it is possible to apply a greater force to the projection, the projection and the seal portion molding die can tightly adhere to each other by the greater force.

In the intake device according to the first aspect, it is preferable that the projection is formed to extend along a forming region of the seal portion from one end surface to the other end surface of the valve body main body in a width direction of the valve body main body which is a direction in which the rotation axial line extends.

According to this configuration, it is possible to divide the seal portion disposing region of the seal portion molding die and the surface region on the inner side of the valve body main body by the projection from one end surface to the other end surface in the width direction of the valve body main body. As a result, it is possible to reliably suppress the flowing of the seal portion forming material into the surface region on the inner side of the valve body main body.

In the intake device according to the first aspect, it is preferable that the projection includes a first projection provided along the forming region of the seal portion on one surface side of the valve body main body, and a second projection provided along the forming region of the seal portion on the other surface side of the valve body main body.

According to this configuration, on any one of the one surface and the other surface of the valve body main body, it is possible to divide the seal portion disposing region of the seal portion molding die and the surface region on the inner side of the valve body main body by the projection. As a result, on any one of the one surface and the other surface of the valve body main body, it is possible to suppress the flowing of the seal portion forming material into the surface region on the inner side of the valve body main body.

In this case, it is preferable that a protrusion height of any one of the first projection and the second projection is greater than a protrusion height of the other one of the first projection and the second projection.

According to this configuration, in a case where a curve of the valve body main body to one surface side of the valve body main body provided with the first projection is large, by making the protrusion height of the first projection greater than the protrusion height of the second projection, it is possible to apply a force which is greater than that to the second projection to the first projection by the seal portion molding die. As a result, since it is possible to apply a force that makes the valve body main body curved to the other surface side by the seal portion molding die, in a case where the curve of the valve body main body to one surface side of the valve body main body is large, it is possible to correct the curve of the valve body main body. In addition, in a case where the curve of the valve body main body to the other surface side of the valve body main body provided with the second projection is large, by making the protrusion height of the second projection greater than the protrusion height of the first projection, it is possible to apply the force which is greater than that to the first projection to the second projection by the seal portion molding die. As a result, since it is possible to apply a force that makes the valve body main body curved to one surface side by the seal portion molding die, in a case where the curve of the valve body main body to the other surface side of the valve body main body is large, it is possible to correct the curve of the valve body main body.

In the configuration in which the projection includes the first projection and the second projection, it is preferable that the first projection and the second projection are disposed at a position at which a moment caused by a mold clamping load is not generated when the mold clamping load is applied to the first projection and the second projection by a seal portion molding die.

According to this configuration, when the mold clamping load is applied to the first projection and the second projection, as the moment is generated to the valve body main body by the mold clamping load, it is possible to suppress generation of deformation in the valve body main body. As a result, when forming the seal portion, it is possible to suppress deterioration of dimension accuracy of the valve body main body.

A manufacturing method of a valve body according to a second aspect of this disclosure includes: preparing a valve body main body which is disposed to be rotatable in an intake port, made of a resin, and includes a projection which is provided at a surface part adjacent to a region in which an elastically deformable seal portion is formed in the valve body main body and has a shape that gradually becomes tapered toward a tip end side; disposing the prepared valve body main body in a valve body main body disposing region of a seal portion molding die; applying a mold clamping load to the projection disposed in the valve body main body disposing region of the seal portion molding die by the seal portion molding die; and forming the seal portion by allowing a seal portion forming material to flow into the seal portion disposing region of the seal portion molding die in a state where the mold clamping load is applied to the projection.

In the manufacturing method of the valve body according to the second aspect of this disclosure, as described above, in a state where the mold clamping load is applied to the projection, as the seal portion forming material flows into the seal portion disposing region of the seal portion molding die, the seal portion is formed. Accordingly, when forming the seal portion in the valve body main body by the seal portion molding die, even when there is an unevenness in dimension of the valve body main body, the projection of the valve body main body and the seal portion molding die can tightly adhere to each other. As a result, since it is possible to divide the seal portion disposing region of the seal portion molding die and the surface region on the inner side of the valve body main body by the projection, it is possible to suppress the flowing of the seal portion forming material into the surface region on the inner side of the valve body main body. Accordingly, it is possible to suppress deterioration or the like of the strength of the seal portion and the dimension accuracy of the seal portion caused by the fact that the flowing-in part is generated as a flash due to the flowing of the seal portion forming material into the surface region on the inner side of the valve body main body, and that the amount of the seal portion forming material which forms the seal portion decreases due to the flowing of the seal portion forming material into the surface region on the inner side of the valve body main body. In addition, it is possible to suppress generation of deformation in the valve body main body caused by the pressure of the seal portion forming material is applied to the valve body main body due to the flowing of the seal portion forming material into the surface region on the inner side of the valve body main body. As a result, when forming the seal portion, it is possible to suppress generation of a manufacturing defect in the valve body due to the flowing of the seal portion forming material into the surface region on the inner side of the valve body main body. In addition, as the projection has a shape which gradually becomes tapered toward the tip end side, compared to a case where the projection has a substantially constant width from a root side to the tip end side, it is possible to apply the mold clamping load to a small area. As a result, since it is possible to apply a greater force to the projection, the projection and the seal portion molding die can tightly adhere to each other by the greater force.

In addition, in the intake device according to the above-described first aspect, the following configurations are also conceivable.

Supplementary Item 1

For example, in the configuration in which the projection includes the first projection and the second projection, preferably, a single first projection is provided corresponding to the seal portion on one surface side of the valve body main body, and a single second projection is provided corresponding to the seal portion on the other surface side of the valve body main body.

Supplementary Item 2

In addition, in a configuration in which the first projection and the second projection are disposed at a position at which the moment caused by a mold clamping load is not generated, preferably, the first projection and the second projection are disposed on a straight line which extends along an applying direction of the mold clamping load, on a section orthogonal to the direction in which the first projection and the second projection extend.

Supplementary Item 3

In addition, in the intake device according to the first aspect, preferably, the projection is a crushed projection. According to the configuration, compared to a case where the projection is not crushed, when forming the seal portion, it is possible to further improve adhesiveness between the seal portion molding die and the projection. As a result, when forming the seal portion, it is possible to more effectively suppress the flowing of the seal portion forming material into the surface region on the inner side of the valve body main body.

In addition, in the manufacturing method of the valve body according to the above-described second aspect, the following configuration is also considered.

Supplementary Item 4

For example, in the manufacturing method of a valve body according to the second aspect, preferably, applying the mold clamping load to the projection includes forming the crushed projection by crushing the projection by applying the mold clamping load to the projection. According to the configuration, compared to a case where the projection is not crushed, when forming the seal portion, it is possible to further improve adhesiveness between the seal portion molding die and the projection. As a result, when forming the seal portion, it is possible to more effectively suppress the flowing of the seal portion forming material into the surface region on the inner side of the valve body main body.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A manufacturing method of a valve body comprising:
preparing a valve body main body which is disposed to be rotatable in an intake port and which is made of a resin, the valve body main body including a projection which is provided at a surface part in the valve body main body connected to a region of the valve body main body in which an elastically deformable seal portion is configured to be formed, the projection protruding beyond the surface part and including a shape that gradually becomes tapered toward a tip end side of the projection;
disposing the prepared valve body main body in a valve body main body disposing region of a seal portion molding die;
applying a mold clamping load to the projection disposed in the valve body main body disposing region of the seal portion molding die by the seal portion molding die; and
forming the seal portion by allowing a seal portion forming material to flow into the seal portion disposing region of the seal portion molding die in a state where the mold clamping load is applied to the projection,
wherein the projection includes a first projection provided along the forming region of the seal portion on one surface side of the valve body main body, and a second projection provided along the forming region of the seal portion on the other surface side of the valve body main body, and
wherein the first projection and the second projection are disposed at a position at which a moment caused by a mold clamping load is not generated when the mold clamping load is applied to the first projection and the second projection by a seal portion molding die.

2. The manufacturing method according to claim 1,
wherein the first projection and the second projection are arranged on a straight line extending in a direction in which the mold clamping load is applied, the straight line being positioned in a cross-section orthogonal to a direction in which the first projection and the second projection extend.

3. An intake device comprising:
an intake port; and
a valve body which is disposed in the intake port and is rotated around a rotation axial line between an open/closed position,
wherein the valve body includes a valve body main body made of a resin, an elastically deformable seal portion formed to extend along an outer circumferential portion of the valve body main body, and a projection which is provided at a surface part in the valve body main body that is connected to a region of the valve body main body in which the seal portion is formed, the projection protruding beyond the seal portion and including a shape that gradually becomes tapered toward a tip end side of the projection.

4. The intake device according to claim 3,
wherein the projection is formed to extend along a forming region of the seal portion from one end surface to the other end surface of the valve body main body in a width direction of the valve body main body which is a direction in which the rotation axial line extends.

5. The intake device according to claim 3,
wherein the projection includes a first projection provided along the forming region of the seal portion on one surface side of the valve body main body, and a second projection provided along the forming region of the seal portion on the other surface side of the valve body main body.

6. The intake device according to claim 4,
wherein the projection includes a first projection provided along the forming region of the seal portion on one surface side of the valve body main body, and a second projection provided along the forming region of the seal portion on the other surface side of the valve body main body.

7. The intake device according to claim 5,
wherein a protrusion height of any one of the first projection and the second projection is greater than a protrusion height of the other one of the first projection and the second projection.

8. The intake device according to claim 6,
wherein a protrusion height of any one of the first projection and the second projection is greater than a protrusion height of the other one of the first projection and the second projection.

\* \* \* \* \*